United States Patent [19]

Billette et al.

[11] 4,006,634
[45] Feb. 8, 1977

[54] FLOW METER

[75] Inventors: Richard J. Billette, Dublin; Arthur R. Zias, Los Altos, both of Calif.

[73] Assignee: National Semiconductor Corporation, Santa Clara, Calif.

[22] Filed: Sept. 17, 1975

[21] Appl. No.: 614,329

[52] U.S. Cl. ................................................ 73/207
[51] Int. Cl.² .......................................... G01F 1/22
[58] Field of Search ............................. 73/207, 211

[56] References Cited

UNITED STATES PATENTS

| 2,035,472 | 3/1936 | Hammond | 73/207 |
|---|---|---|---|
| 2,873,104 | 2/1959 | Horwood | 73/207 X |
| 2,989,866 | 6/1961 | Widell et al. | 73/207 |
| 3,403,556 | 10/1968 | Koester | 73/207 |

FOREIGN PATENTS OR APPLICATIONS

| 562,398 | 9/1923 | France | 73/207 |
|---|---|---|---|

Primary Examiner—Richard C. Queisser
Assistant Examiner—John P. Beauchamp
Attorney, Agent, or Firm—Lowhurst & Aine

[57] ABSTRACT

A flow meter includes a variable area obstruction mounted in a conduit and a differential pressure transducer having its two ports mounted on opposite sides of the obstruction in fluid communication with the fluid flowing through the conduit. The variable area obstruction is formed of one or more flexible leaves which extend into the flow stream and are deflectable under the influence of fluid pressure, such that an increased flow rate increases the deflection of the leaves and decreases the area of the obstruction.

4 Claims, 11 Drawing Figures

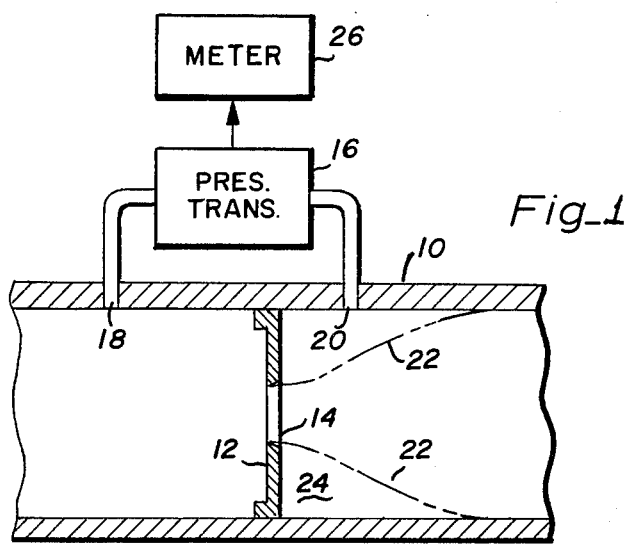
Fig_1
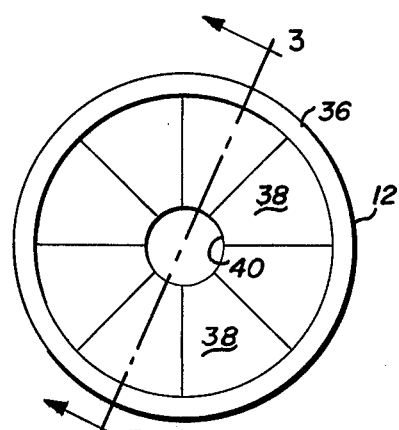
Fig_2
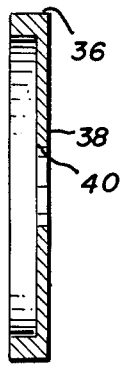
Fig_3
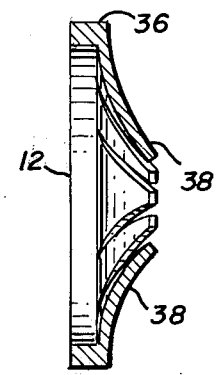
Fig_4
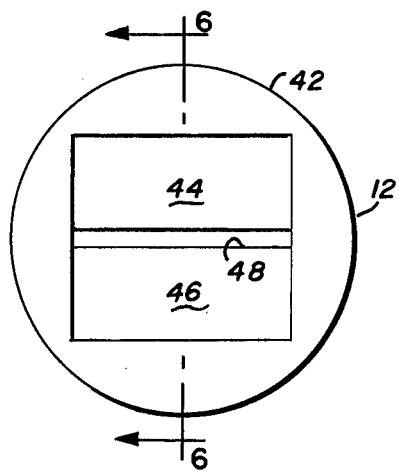
Fig_5
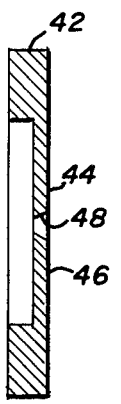
Fig_6
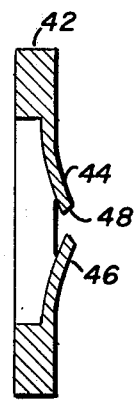
Fig_7

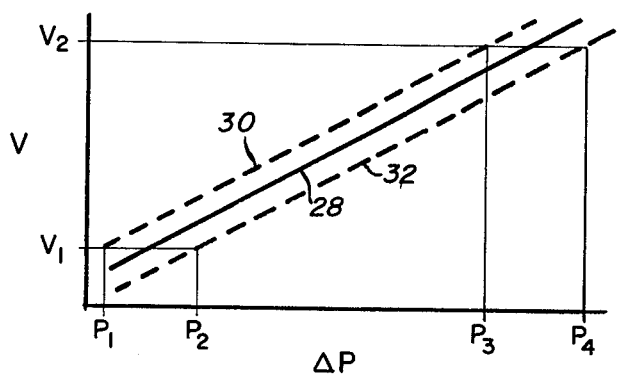
Fig_8
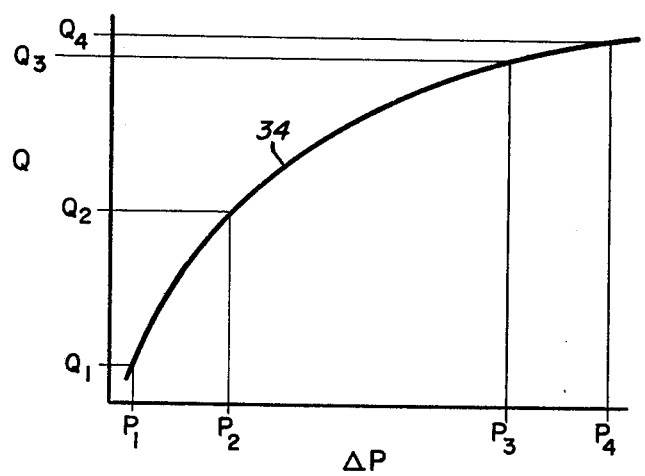
Fig_9
PRIOR ART
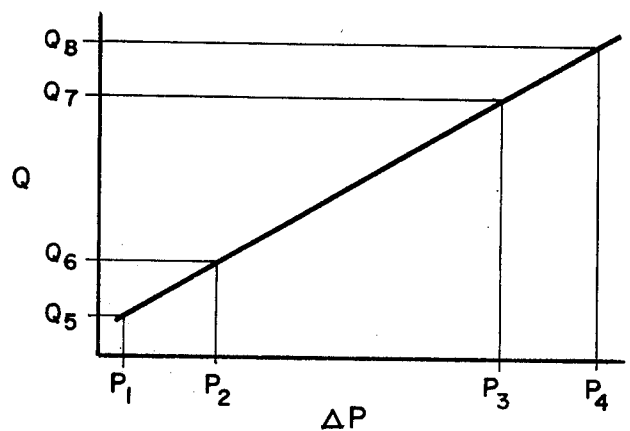
Fig_10
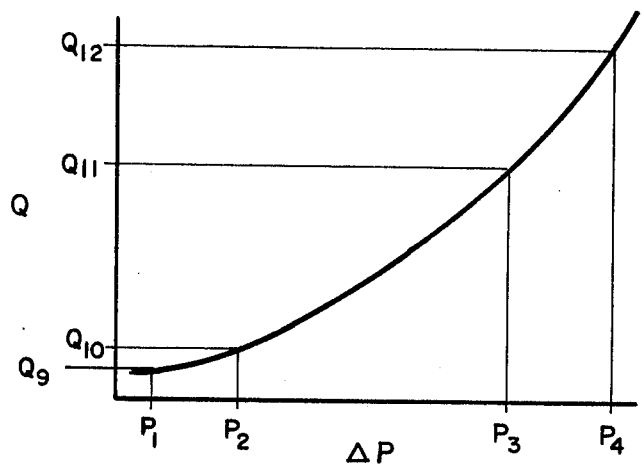
Fig_11

FLOW METER

BACKGROUND OF THE INVENTION

1. Field of the Invention

This invention relates generally to a flow meter, and more particularly to a variable area obstruction in a conduit for use with a pressure transducer to measure the flow rate of a fluid in that conduit.

2. Prior Art

A number of different types of flow meters are presently available for measuring the flow rate of a fluid in a conduit. These flow meters can be classified broadly into two groups; namely, the group which presents little or no interference to the flow stream and the group which has a significant influence on the flow stream. The first group of devices which present relatively little or no interference to the flow stream are relatively elaborate and expensive systems. The present invention is concerned with the second group of flow meters which are less elaborate and considerably less expensive, but present some significant amount of interference to the flow stream.

This second group of flow meters includes the type which is position and/or displacement oriented and the type having no moving parts. The position and/or displacement type of flow meter includes some movable part which changes its position, displacement or velocity in response to the flow of fluid with respect thereto. Examples of such compliant type of flow meters are the turbine flow meters, the variable capacitance flow meters, and the oscillating vane flow meters. These compliant type of flow meters all have the usual problems associated with moving parts. Furthermore, because of the relatively large pressure drop produced by these flow meters, they are normally not employed in a closed flow system, but rather in an open flow.

The second group of flow meters having no moving parts employ some type of obstruction in the flow stream and a differential pressure transducer for measuring the difference in fluid pressure across the obstruction. The obstruction in this type of flow meter has been formed in the past of either a plate having a fixed area orifice therein, a venturi, or a flow nozzle. The pressure differential across the obstruction is a measure of the flow rate of the fluid passing through the conduit. Under constant pressure and enthalpy conditions, this pressure differential is proportional to the square of the flow rate of the fluid in the conduit. This square law relationship is highly undersirable, since the error at the lower flow rates is a greater percentage of the flow rate than the error at the higher flow rates. It is generally desirable, when measuring flow rates, to have an error which is equal at both the lower flow rates and the higher flow rates. When flow rate is to be employed for measuring accumulated volume, it is desirable to have an error at the lower flow rates which is less than that at the higher flow rates, such that the error associated with accumulated volume is constant with changes in the flow rate.

SUMMARY OF THE INVENTION

It is, therefore, an object of the present invention to provide a flow meter of the type employing an obstruction in a conduit and a pressure differential connected across the obstruction, in which the area of the obstruction in a plane transverse to the flow of fluid in the conduit is variable with fluid pressure exerted thereon.

Another object of the present invention is to provide such a flow meter in which the area of the obstruction in a plane transverse to the flow of fluid in the conduit is directly proportional to the fluid pressure exerted thereon.

Still another object of the present invention is to provide such a flow meter in which the flow rate of the fluid in the conduit is approximately linearly proportional to the pressure differential across the obstruction.

A further object of the present invention is to provide such a flow meter in which the flow rate of the fluid in the conduit is approximately proportional to the square of the pressure differential across the obstruction.

These and other objects of the present invention are attained by a flow meter which includes an obstruction mounted in a conduit and a differential pressure transducer connected to that conduit to measure the pressure differential across the obstruction, with the obstruction having an area in a plane transverse to the flow of fluid in the conduit which is variable in response to the fluid pressure exerted thereon.

The invention, however, as well as other objects, features and advantages thereof will be more fully realized and understood from the following detailed description, when taken in conjunction with the accompanying drawings, wherein:

BRIEF DESCRIPTION OF THE DRAWINGS

FIG. 1 is a view partially in section of a flow meter of the type which the present invention is concerned with.

FIG. 2 is an elevational plan view of a variable area obstruction which can be employed in the flow meter illustrated in FIG. 1 and which is constructed in accordance with the principles of the present invention.

FIG. 3 is a sectional view taken generally along line 3—3 of FIG. 2.

FIG. 4 is a sectional view similar to that illustrated in FIG. 3, but with the obstruction in a partially flexed state.

FIG. 5 is an elevational plan view of another embodiment of the variable area obstruction which can be employed in the flow meter illustrated in FIG. 1 and which is constructed in accordance with the principles of the present invention.

FIG. 6 is a sectional view taken generally along line 6—6 of FIG. 5.

FIG. 7 is a sectional view similar to that illustrated in FIG. 6, but with the obstruction in a flexed state.

FIG. 8 is a graph illustrating the pressure versus voltage relationship of the pressure transducer illustrated in FIG. 1.

FIG. 9 is a graph illustrating the pressure versus flow rate relationship of a prior art flow meter of the type illustrated in FIG. 1.

FIG. 10 is a graph illustrating the pressure versus flow rate relationship of a flow meter constructed in accordance with the principles of the present invention.

FIG. 11 is a graph illustrating the pressure versus flow rate relationship of another flow meter constructed in accordance with the principles of the present invention.

Like reference numerals throughout the various views of the drawings are intended to designate the same or similar elements.

DETAILED DESCRIPTION OF THE PREFERRED EMBODIMENTS

With reference to FIG. 1, there is shown a flow meter for measuring the flow rate of a fluid passing through a conduit 10. An obstruction 12 is mounted in the conduit and is formed of a circular plate having a central aperture 14 therein. A differential pressure transducer 16 has a pair of ports 18 and 20 mounted on opposite sides of the obstruction 12 and in fluid communication with the fluid passing through the conduit 10. As is well known, the pressure transducer 16 provides an output which is directly proportional to the flow rate of the fluid passing through the conduit 10. Briefly, however, this type of flow meter operates in the following manner.

When the obstruction 12 is provided in the stream of a fluid passing through the conduit 10, as shown in FIG. 1, a boundary condition will result in the downstream portion of the fluid stream, as represented by the phantom lines designated with the reference numeral 22. The pressure of the fluid between the phantom lines 22 will be equal to the pressure of the fluid upstream of the obstruction 12. However, the pressure of the fluid between the phantom lines 22 and the obstruction 12, in an area called "curl" and designated with the reference numeral 24, will be equal to the pressure of the fluid at the opening 14 in the obstruction 12.

It will be noted that the port 18 of the differential pressure transducer 16 is in fluid communication with the fluid upstream of the obstruction 12 and that the port 20 of the transducer 16 is in fluid communication with the curl portion of the fluid in the conduit 10. The differential pressure transducer 16 provides an output corresponding to the difference between the pressure of the fluid at the port 18 and the pressure of the fluid at the port 20. This output is measured and displayed by a meter 26 which can be calibrated to read in units of flow rate, such as gallons per minute. Examples of differential pressure transducers are disclosed in the first edition of a catalog and handbook of Integrated Pressure and Temperature Transducers published by National Semiconductor, Inc., and dated August 1974.

Under constant temperature and enthalpy conditions, the differential pressure, $\Delta P$, measured by the transducer 16 can be expressed by the following expression.

$$\Delta P = \frac{V_1{}^2 - V_2{}^2}{2g} , \quad (1)$$

where $V_1$ is the velocity of the fluid at the opening 14, $V_2$ is the velocity of the fluid at the port 18, and $g$ is the acceleration of gravity, 32.2 fps$^2$.

The flow rate, Q, can be expressed by the equation, $$Q = A_1 V_1 = A_2 V_2, \quad (2)$$

where $A_1$ is the transverse cross sectional area of the opening 14 and $A_2$ is the transverse cross sectional internal area of the conduit 10 or the area of the fluid in a plane transverse to the flow stream at the port 18.

By substituting equation (2) into equation (1) and rearranging, the flow rate Q can be expressed as, $$Q^2 = (2g)\Delta P \frac{A_2{}^2 A_1{}^2}{A_2{}^2 - A_1{}^2} . \quad (3)$$

Since the two areas $A_1$ and $A_2$ are known, the flow rate, Q, of the fluid passing through the conduit 10 can be determined by measuring the pressure differential between the ports 18 and 20.

It can be appreciated from the equation (3) that the flow rate is proportional to the square root of the differential pressure across the obstruction 12. This square law relationship between the flow rate and the differential pressure produces an undesirable condition in most applications of the flow meter, as will be explained below.

FIG. 8 is a graph illustrating the pressure versus voltage relationship of the pressure transducer 16 illustrated in FIG. 1, with the differential pressure represented on the axis of abscissas and the voltage output of the transducer 16 represented on the axis of ordinates. The line 28 represents the ideal pressure versus voltage relationship of the pressure transducer 16 and the dotted lines 30 and 32 represent the upper and lower limits of the error which can be expected. If, for example, a voltage $V_1$ is generated at an output of the pressure transducer 16 under certain constant flow rate conditions, because of the tolerances of the pressure transducer 16, that voltage may represent a pressure differential having a range from $P_1$ to $P_2$. If, under different, but constant flow rate conditions, a voltage $V_2$ is generated at an output of the pressure transducer 16, such voltage may represent a range of differential pressures from $P_3$ to $P_4$. Because of the linear relationship of pressure and voltage illustrated in FIG. 8, and the constant error across the linear plot, the range from $P_1$ to $P_2$ is equal to the range from $P_3$ to $P_4$. Accordingly, if an operator observes a reading of $V_1$ on the meter 26, he can expect the pressure differential to be between the values $P_1$ and $P_2$, because of this error. In a typical differential pressure transducer, the output may have an error of plus or minus 0.15 volts, with an output of 2.5 volts at the lower end of the curve and an output of 12.5 volts at the upper end of the curve.

FIG. 9 is a graph of the pressure versus flow rate relationship expressed by equation (3) of a prior art flow meter of the type illustrated in FIG. 1. The differential pressure sensed by the pressure transducer 16 is represented on the axis of abscissas and the flow rate of the fluid flowing through the conduit 10 is represented on the axis of ordinates. The plot of the relationship represented by equation (3) is shown by a curve 34.

The differential pressure $P_1$ corresponds to a flow rate $Q_1$, the differential pressure $P_2$ corresponds to a flow rate $Q_2$, the differential pressure $P_3$ corresponds to a flow rate $Q_3$ and the differential pressure $P_4$ corresponds to a flow rate $Q_4$. It can be appreciated from FIG. 9 that the error of the differential pressure transducer 16 will generate a relatively large error at the lower end of the curve 34 and a relatively small error at the upper end of the curve 34, since the range $Q_2$-$Q_1$ is greater than the range $Q_4$-$Q_3$. This condition is not satisfactory for any known application of a flow meter. If it is desired to measure flow rate, the preferred error profile is one in which the flow rate error is constant along the entire range of pressures. If it is desired to convert flow rate to accumulated volume, the preferred error profile is one in which the flow rate error is relatively small at the lower end of the pressure-flow rate curve and relatively large at the upper end of that curve. More particularly, when accumulated volume is desired, the percentage of error along the entire range of pressures should remain constant.

The present invention overcomes this disadvantage of the fixed area orifice of the prior art by providing an obstruction in the conduit 10 which has an area in a plane transverse to the fluid stream which is variable in response to fluid pressure exerted thereon. As shown in FIG. 2, the obstruction 12 of the present invention is formed of an outer rim portion 36 and a plurality of flexible leaves 38 extending radially inwardly therefrom. The rim portion 36 is disposed for being secured to the inner surface of the conduit 10. The leaves 38 are flexible, such that when fluid pressure is exerted thereagainst, they flex as shown in FIG. 4. It will be noted in FIG. 2 that the ends of the leaves 38 form an opening 40. When the fluid pressure exerted against the obstruction 12 is relatively small or nonexistent, the leaves 38 are in their relaxed, unflexed state, as shown in FIG. 3. Under such conditions, the opening 40 is relatively small and therefore, the area of the obstruction in a plane transverse to the fluid stream is relatively large. However, as the pressure of the fluid increases, with increased velocity thereof, the leaves 38 begin to flex, thereby decreasing the area of the obstruction in a plane transverse to the fluid stream.

If, for example, $$\frac{A_2^2 A_1^2}{A_2^2 - A_1^2} = Q, \quad (4)$$

then, from equation (3), $$Q = 2g, \Delta P. \quad (5)$$

It can be appreciated that if the left hand side of equation (4) is proportional to fluid flow, then a linear relationship exists between fluid flow and differential pressure as expressed in equation (5). Since fluid flow is variable, one of the quantities on the left hand side of equation (4) must also be variable in accordance therewith. This is accomplished by the variable area obstruction of the present invention in which the area $A_1$ varies with fluid pressure.

A plot of equation (5) is illustrated in FIG. 10. As shown therein, the error along the entire length of the linear curve is constant, since $Q_8-Q_7$ is equal to $Q_6-Q_5$.

If, on the other hand, $$\frac{A_2^2 A_1^2}{A_2^2 - A_1^2} = Q\sqrt{Q}, \quad (6)$$

then, from equation (3), $$\sqrt{Q} = 2g \Delta P. \quad (7)$$

The plot of equation (7) is illustrated in FIG. 11. As shown therein, the error at the lower end of the curve is considerably smaller than the error at the upper end of the curve. It can be appreciated from the above, therefore, that the area of the opening through the obstruction 12 can control the relationship between flow rate and differential pressure. By properly dimensioning the size of the leaves 38, the area of the opening presented to the flow stream by the obstruction 12 can vary to provide either a constant error with changes in fluid velocity or a constant percentage of error with changes in fluid velocity.

In a theoretical analysis of an obstruction in a flow stream, an obstruction similar to that illustrated in FIG. 2 was analyzed, with the exception that it had only four leaves, with each leaf occupying one quadrant of the area circumscribed by the rim 36, and each leaf terminated in a flat end, such that the opening 40 was square. Also, the leaves had a thickness of 0.005 inch and a Young's modulus of $3 \times 10^7$ pounds/inch$^2$. The inside diameter of the rim 36 was assumed to be one inch and the inner end of each leaf was assumed to be 0.03 inch. The obstruction was analyzed on the basis of each leaf representing a cantilever beam. In this respect, therefore, several assumptions were made in the analysis. However, it is not believed that these assumptions produced any drastic change in the results of this analysis.

The results of this analysis are shown in Tables I and II.

TABLE I

| DIFFERENTIAL PRESSURE, P, PSI | AREA, $A_1$, SQUARE INCH, $\times 10^{-3}$ |
|---|---|
| 0 | 0.900 |
| 1 | 0.904 |
| 2 | 0.948 |
| 3 | 1.013 |
| 4 | 1.109 |
| 5 | 1.239 |
| 6 | 1.407 |
| 7 | 1.619 |
| 8 | 1.882 |
| 9 | 2.202 |
| 10 | 2.588 |
| 11 | 3.049 |
| 12 | 3.595 |
| 13 | 4.237 |
| 14 | 4.986 |
| 15 | 5.852 |
| 20 | 12.405 |
| 25 | 23.882 |
| 30 | 41.942 |
| 35 | 68.010 |
| 40 | 103.043 |

TABLE II

| DIFFERENTIAL Pressure, $\Delta P$, PSI | FLOW RATE, Q, GAL/MIN |
|---|---|
| 0 | 0 |
| 1 | .04285 |
| 2 | .06355 |
| 3 | .08317 |
| 4 | .10513 |
| 5 | .13132 |
| 6 | .16336 |
| 7 | .20304 |
| 8 | .25231 |
| 9 | .31312 |
| 10 | .38792 |
| 11 | .47933 |
| 12 | .59029 |
| 13 | .72412 |
| 14 | .88429 |
| 15 | 1.07431 |
| 20 | 2.62960 |
| 25 | 5.66003 |
| 30 | 10.88900 |
| 35 | 19.07151 |
| 40 | 30.89064 |

It can be appreciated that the plot illustrated in FIG. 11 closely approximates the values given in Table II. Scaling can be accomplished by employing a "look-up" table, such as a read only memory, when the flow meter of the present invention is used in a digital readout system.

A second embodiment of the present invention is illustrated in FIGS. 5, 6 and 7, wherein the obstruction 12 includes an outer rim portion 42 and a pair of rectangularly shaped leaves 44 and 46 secured thereto. When the leaves 44 and 46 are in their relaxed, unflexed state, they are shown in FIG. 6. However, under increased fluid velocity and, therefore, increased fluid pressure, the leaves 44 and 46 flex as shown in FIG. 7 to increase the size of the opening 48 presented to the fluid stream.

It can be appreciated that the leaves 38 and the leaves 44 and 46 can be appropriately dimensioned to provide any desired result. For example, the thickness of these leaves may vary from one end to the other end thereof, such that a varying spring constant is presented as flexure occurs. Also, any number of leaves may be provided to form the obstruction 12. It can also be appreciated that the openings 40 and 48 can vary considerably in size and in relationship to the diameter of the rim portion 36. In this respect, the openings 40 and 48 can be reduced to zero by extending the free ends of the leaves to a center point of the obstruction 12. The leaves 44 and 46 may also be extended to overlap one another, if desired. Also, the edges of the leaves can be curled to any desired configuration to control the spring constant thereof. The leaves can be fabricated of any suitable material or layers of several material. It is to be understood, of course, that a large variety of sizes and shapes of leaves can be employed to provide the desired spring constant thereto. Also, these leaves can be dimensioned such that the spring constants thereof vary with changes in pressure exerted thereon.

The invention claimed is:
1. A flow meter comprising:
   a. transducer means for sensing a pressure differential between a first port thereof and a second port thereof,
   b. a conduit with said first port of said transducer means connected at a first location in said conduit and in fluid communication with fluid flowing therethrough, the fluid at a second location in said conduit being connected to and in fluid communication with said second port, and
   c. an obstruction mounted in said conduit between said first location and said second location, said obstruction comprising a plurality of independently flexible spring fingers extending initially in a plane transverse to the flow of fluid in said conduit each of said fingers being compliant to said fluid flow and deflected in response to one parameter of said fluid flow whereby said obstruction to said fluid flow varies in response to said one parameter.

2. The flow meter of claim 1, wherein said element is subject to flexure in response to the velocity of the fluid in said conduit.

3. The flow meter of claim 1, wherein the spring constant of said spring fingers is of a value to provide a flow rate-differential pressure relationship which is approximately linear.

4. The flow meter of claim 1, wherein the spring constant of said spring fingers is of a value to provide a flow rate which is approximately proportional to the square of the differential pressure.

* * * * *